United States Patent
Gomez del Valle et al.

(10) Patent No.: US 11,597,496 B2
(45) Date of Patent: Mar. 7, 2023

(54) LEADING EDGE FOR AN AIRFOIL

(71) Applicant: Airbus Operations S.L., Getafe (ES)

(72) Inventors: Javier Carlos Gomez del Valle, Getafe (ES); Alberto Balsa-Gonzalez, Getafe (ES)

(73) Assignee: Airbus Operations S.L., Getafe (ES)

( * ) Notice: Subject to any disclaimer, the term of this patent is extended or adjusted under 35 U.S.C. 154(b) by 0 days.

(21) Appl. No.: 17/123,468

(22) Filed: Dec. 16, 2020

(65) Prior Publication Data

US 2021/0188421 A1    Jun. 24, 2021

(30) Foreign Application Priority Data

Dec. 18, 2019  (EP) ..................... 19383133

(51) Int. Cl.
*B64C 3/28*   (2006.01)
*B64D 45/00*  (2006.01)

(52) U.S. Cl.
CPC ........ *B64C 3/28* (2013.01); *B64D 2045/0095* (2013.01)

(58) Field of Classification Search
CPC ... B64D 2045/0095; B64C 3/18; B64C 3/185; B64C 3/187; B64C 3/30; B64C 7/00; B64C 3/34
See application file for complete search history.

(56) References Cited

U.S. PATENT DOCUMENTS

| | | | |
|---|---|---|---|
| 4,667,906 A | 5/1987 | Suarez et al. | |
| 2010/0242996 A1 | 9/2010 | West et al. | |
| 2017/0106969 A1* | 4/2017 | Pereira Mosqueira | ... B64C 3/26 |
| 2018/0010614 A1* | 1/2018 | Sellinger | ............... F04D 29/324 |
| 2019/0248492 A1 | 8/2019 | Roldan De Perera | |

FOREIGN PATENT DOCUMENTS

EP    3156323 A1    4/2017

OTHER PUBLICATIONS

Experimental Airlines, "Easy Foamboard Wing Airfoil: the Basic Version", Sep. 10, 2011, YouTube [https://www.youtube.com/watch?v=qJZoqGHAIDE] (Year: 2011).*
European Search Report; priority document.

* cited by examiner

*Primary Examiner* — Timothy D Collins
*Assistant Examiner* — Justin Michael Heston
(74) *Attorney, Agent, or Firm* — Greer, Burns & Crain, Ltd.

(57) ABSTRACT

A leading edge for an airfoil of an aircraft includes a leading plate with a convex side and a concave side, and at least one container filled with a non-Newtonian fluid. The leading edge is configured to be secured to the torsion box of the airfoil. The at least one container is arranged between the concave side of the leading plate and the torsion box of the airfoil. An airfoil is also provided including such a leading edge. A method is provided for assembling such a leading edge.

18 Claims, 4 Drawing Sheets

LEADING EDGE FOR AN AIRFOIL

CROSS-REFERENCES TO RELATED APPLICATIONS

This application claims the benefit of the European patent application No. 19383133.6 filed on Dec. 18, 2019, the entire disclosures of which are incorporated herein by way of reference.

FIELD OF THE INVENTION

The present invention belongs to the field of aircraft parts, in particular it relates to the field of reinforced leading edges for airfoils able to withstand bird strikes.

In particular, the present invention proposes a leading edge dealing with the dilemma of increasing weight commonly implied in leading edge reinforcements to meet the structural requirements of bird strike situations.

BACKGROUND OF THE INVENTION

One of the most critical and restrictive certification requirements for an aircraft is related to behavior and tolerance to the damage which results from an impact with an external flying body, generally in the form of a bird strike.

This undesired situation takes place regularly entailing, for instance, the aero-shape alteration of the airfoil. Further, it makes the area between the nose and the front bulkhead to become pressurized by the ram-air likely causing failure of upward installations.

In an example, according to the European Aviation Safety Agency's Certification Memoranda, an airplane must be designed so as to ensure capability of continued safe flight and landing of the airplane after impact with a 4 lb. bird when the velocity of the airplane (relative to the bird along the airplane's flight path) is equal to the Design Cruise Speed at sea level or a 0.85 factor of the Design Cruise Speed at 8000 feet, whichever is the more critical.

In another example of certification requirements for an aircraft in order to assure operability after a bird impact, the leading edge of lifting surfaces such as the wing, the horizontal tail plane ('HTP') or the vertical tail plane ('VTP') must be able to bear an impact energy equivalent to 8 lbs. (3.628 kg) at a speed of 330 Kts (170 m/s).

In view of the potentially hazardous consequences of a bird strike, current solutions implemented in the aerodynamic lifting surfaces manufacturing industry consist of reinforcing the leading edges of the lifting surfaces with auxiliary elements that provide enhanced resistance against collision.

The leading edge of an airfoil contributes in the aerodynamics and performance of the aircraft. An airfoil may be traditionally divided into a torsion box (the central part of the airfoil, bearing the torsion load due to the lift forces distribution spanwise) and leading and trailing edges positioned front and rear of the torsion box, respectively.

Leading edges are expected to fulfil both mechanical and weight requirements. They must be able to resist impacts (i.e., protect the primary structure) while ensuring the aerodynamic shape, but they may not weigh more than strictly necessary following the well-known principle of reducing weight in aircraft design.

Currently, composite materials, especially those made from carbon fibers and glass fibers, are widely used in the manufacturing of lifting surfaces, due to their advantageous properties over metallic parts. In particular, among those properties is a substantial weight reduction when compared with traditional metallic components, leading to an improvement in the fuel-efficiency. Regarding structural properties, composites also outshine metallic alternatives in terms of strength-to-weight ratio (i.e., specific strength). In addition, they resist compression and do not easily break under tension.

Composites are almost immune to corrosion due to harsh chemicals, and also resistant to many highly reactive chemicals. Further, they can operate under wide variations in temperature and exposure to severe weather while maintaining their shape and size.

Among all the types of fibers used in the aircraft industry, carbon fiber is the preferred choice in most scenarios, due to its excellent overall properties. However, Carbon Fiber Reinforced Plastics (CFRP) weakness includes significant brittleness.

This results in a poor behavior against potential impacts, if not provided with the proper means for enhancing resistance. In order to achieve the enhanced resistance, several approaches have been developed.

One of the ways implemented in the industry of composite manufacturing for increasing the impact resistance of composite leading edges consists of interlaminar reinforcement by oversizing the layup configuration. That is, the number of carbon fiber layers is increased, while interposing several glass fiber layers, which is known for having a better behavior against impact damage.

However, the designer flexibility for patterning the layup configuration is jeopardized and, as a result, the designer is forced to modify the distribution of layers taking into account the impact damage resistance criteria, which reduces structural optimization.

Other ways for increasing the impact resistance of composite leading edges make use of metallic plates (e.g., steel or titanium) coupled to the outer skin of the leading edge so as to receive direct impact. Also, metallic plates can be installed within the leading edge internal volume located between the concave side of the leading plate and an internal rib/spar of the structural torsion box of the lifting surface.

Therefore, all the known ways for increasing tolerance to impact damage of aircraft composite leading edges consist of solid and rigid materials implemented so as to cooperate with the leading edge plate which receives the mechanical impact, thus absorbing the impact energy. These solid materials jeopardize the structural optimization and contribute to increase the total weight of the aircraft.

SUMMARY OF THE INVENTION

The present invention provides an alternative solution for the aforementioned problems by a leading edge according to claim 1 and an airfoil incorporating this leading edge. The invention also provides a method for assembling such a leading edge.

All the features described in this specification, including the claims, description and drawings, can be combined in any combination, with the exception of combinations of such mutually exclusive features.

Throughout the entire document, reference shall be made to a number of particular terms for which a description will be now provided. Therefore, these terms must be construed as follows.

A "composite material" or "composite laminate" will be understood as any type of material, for example CFRP (Carbon Fiber Reinforced Polymers), which comprises two or more constituent materials with significantly different physical and/or chemical properties that, when combined, produce a material with characteristics different from the individual constituent materials.

In relation with the geometry of lifting surfaces, the wing, horizontal stabilizer ('HTP', Horizontal Tail Plane), vertical stabilizer ('VTP', Vertical Tail Plane) and propeller of an aircraft are all based on airfoil sections.

"Airfoil sections" or "airfoils" will be understood as the cross-sectional shape of a lifting surface, the shape being determined so as to generate an aerodynamic force in the event of relative movement through a fluid, the component of the force perpendicular to the direction of motion being called lift.

Then, "an airfoil of a lifting surface" is understood as a structural element of an aerodynamic surface of an aircraft in terms of "a portion of the lifting surface". Accordingly, the sum of airfoils between two points measured spanwise on the lifting surface results in another larger portion of the lifting surface. Thus, the sum of airfoils throughout the entire span of the lifting surface expresses the lifting surface itself and, hence, in further embodiments, this portion of the lifting surface may be the entire lifting surface.

Further in relation with the geometry of lifting surfaces, the term "span" refers to the distance from one tip of the lifting surface (e.g., the wingtip) to the root and "spanwise" refers to "along/in the direction of the span".

The "leading edge" will refer to the foremost edge of the lifting surface and thus, of the airfoil, as the aircraft moves forward. A leading edge comprises a curved plate (also referred to as "leading plate"), wherein the convex side is an outer surface which is part of the outer skin of the lifting surface, the convex side being exposed to the incident airstream. Typically, the convex side of the leading plate provides aerodynamic continuity with the upper and lower skins of the lifting surface.

In turn, the concave side of the leading plate is an inner surface which is exposed to the inner volume of the lifting surface, namely to a cavity therein.

In the context of an embodiment according to the present invention which comprises an airfoil comprising a leading plate and a torsion box, the concave side of the leading plate is the side which is seen from the torsion box. Accordingly, a cavity is formed within the leading edge, wherein the inner surface and the torsion box are opposed surfaces, each one defining a portion of the cavity boundaries.

Finally, throughout this document, references to a Non-Newtonian fluid shall be understood as a fluid whose viscosity is variable based on applied stress or force. That is, viscosity can change in a bidirectional manner upon exertion of stress or force, to either more liquid (in the absence of this force) or more solid (when such force is applied).

According to a first inventive aspect, the invention provides a leading edge for an airfoil of an aircraft, the leading edge comprising:
 a leading plate with a convex side and a concave side,
 at least one container filled with a non-Newtonian fluid, wherein the leading edge is configured to be secured to a torsion box of the airfoil thus forming a cavity between the concave side of the leading plate and the torsion box of the airfoil, the at least one container being arranged at least partially within the cavity.

The leading edge of the invention may be installed in any airfoil comprising a torsion box. Torsion boxes usually comprise a front spar, which is close to the leading edge, and a rear spar, which is away from the leading edge.

The particles of the non-Newtonian fluid contained within the container will react upon an impact with an external flying body, such as a bird, by modifying its viscosity. These particles will agglutinate locally in the area of collision so as to behave as a solid body for the absorption and dispersion of the kinetic energy transferred between the colliding flying body and the leading plate as a result of the impact.

Advantageously, due to the aforementioned intrinsic properties of non-Newtonian fluids, the greater the energy of the impact, the stronger the union between molecules. And so, higher will be the resistance exerted upon the resulting load. This effect results in providing a leading edge of the invention with an adaptive and wide specter of potential load reactions for a given volume of non-Newtonian fluid.

Regarding the density of this given volume of non-Newtonian fluid, the values are between 0.9-1.2 kg/m$^3$. Therefore, the density values are lower than those of carbon fiber (1.5-1.6 kg/m$^3$) and much lower than the corresponding values for metallic reinforcing structures (4.5 kg/m$^3$ for titanium and 7.8 kg/m$^3$ for steel). This reduction in the values of the cited parameters when implementing non-Newtonian fluid over materials implemented in other solutions for reinforcing the leading edges of lifting surfaces remain during the whole operation of the aircraft.

Advantageously, the range of density values is due to the chemical composition of the non-Newtonian fluid and remain essentially unaltered by changes in the environmental conditions (i.e., temperature and pressure) resulting from height variations.

Accordingly, the leading edge according to the present invention allows achieving a great weight reduction of the whole lifting surface structure when compared with the current solutions known in the aircraft industry which make use of a solid structure for reinforcing such lifting surfaces against potential collisions with external flying objects. This technical advantage is particularly relevant when applied to lifting surfaces comprising great dimensions, such as wings, wherein the weight reduction achieved is measured in tens of kg.

Further, some lifting surfaces couple with the main airframe, i.e., the fuselage, forming an angle (i.e., it has a 'swept angle' backward, e.g., 30° for some horizontal tail planes) with the theoretical flight direction. As a consequence, potential flying objects which may impact the surfaces, will engage the leading edge of the corresponding lifting surface in a non-perpendicular direction. Therefore, upon collision, the resulting load transferred to the structure will have more than one directional component in a plane, thus the affected area being larger.

Further, the object may be dragged along the leading edge in an advance direction towards the tip of the surface. As a result of this complexity in the simulation of an impact, current solutions in the state of the art provide additional reinforcement of the leading edge.

In relation with the internal mechanism of energy dispersion for the containers filled with non-Newtonian fluid, the energy transferred between the colliding body and the leading plate is internally distributed throughout the volume of the fluid in the form of hydrostatic pressure. Advantageously, the present invention allows a better optimization of the upcoming loads resultant from an impact due to the internal distribution of energy achieved by the non-Newtonian fluid. Thus, typical additional reinforcements may be suppressed within the present invention.

Further advantageously, the aforementioned suppression of additional layers in the composite layup pattern allows the designer to optimize the distribution of layers in order to achieve a better structural behavior. Further, the addition of layers increased the probability of encountering internal defects such as wrinkling or delaminations, and the presence of porosity or impurities.

Since the leading edge prevents the implementation of additional reinforcing solid structures, such as a corrugated metallic sheet, physical connections between additional solid parts are thus prevented. Accordingly, the presence of fastening means, such as bolts or screws is also greatly reduced, thus avoiding fracture origin spots over the lifting surface upon a bird strike.

In addition, maintenance of the parts affected of the leading edge is reduced, as well as its replacements. In this sense, conventional reinforcing solutions which make use of solid elements, such as the aforementioned metallic sheet, need to be fully replaced after an impact event, since the whole leading edge structure is thus deformed and damaged.

In a particular embodiment, at least a portion of a wall of the container is made of a resilient material.

In a more particular embodiment, the container is an elastic bag filled with non-Newtonian fluid. Unlike prior art, due to the resilient nature of the elastic bag filled with non-Newtonian fluid, it can return to its state of internal equilibrium, thus recovering the original shape, after a collision. Accordingly, in the event of an impact, only the leading edge portion will need to be replaced or repaired.

In a preferred embodiment, the leading edge of the invention is designed so as to leave an internal volume which permits free-deformation of the container upon a change of the shape of the non-Newtonian fluid. In other words, the leading edge is designed so as to permit free-deformation of the container at least partially within the cavity upon a change of the shape of the non-Newtonian fluid contained therein. The container is mounted in the leading edge so as to leave at least some free (air-filled) spaces in the cavity, such that the non-Newtonian fluid and container may deform toward one or more of these free spaces, in particular in case of receiving a shock.

It is to be noted that in any of these embodiment, the container needs to be fluid-tight in order to avoid any leakage of the non-Newtonian fluid.

Further, non-Newtonian fluid and the related manufacturing and handling processes associated are not as expensive as, carbon fibers, titanium and their respective manufacturing processes. Therefore, the cost of this leading edge would be less than the cost of the current solutions used in the state of the art.

In an embodiment, the leading edge further comprises at least one nose rib arranged so as to be secured to the torsion box of the airfoil.

It is to be noted that the torsion box of the airfoil comprises at least one rib.

This improves load transferring from the affected leading plate towards a structural element able to distribute it to the corresponding rib of the torsion box. Then, the overall effect is further minimized.

In a more particular embodiment, the at least one nose rib is arranged so as to coincide in location with a corresponding rib of the torsion box of the airfoil.

In an embodiment, one container extends along a length portion of the leading edge spanwise up to the nose rib location. Advantageously, the at least one container is further contained by this nose rib in order to improve bird strike withstanding.

Also, this embodiment easies manufacturing and maintenance tasks since the insertion and replacement can be performed modularly.

The airfoil (understood as a portion of the lifting surface) may comprise a single container covering solely such portion in a modular sense with regard to a conventional lifting surface. Its location along this conventional lifting surface may be based on the likelihood of suffering bird strike, for instance inferred from historical data or based on probability.

In a particular embodiment, a single container extends along substantially the entire leading edge length spanwise. In this embodiment, the airfoil is the entire lifting surface.

In a preferred embodiment, a container extends along at least 80% of the length excluding root and tip fairings of the leading edge.

Furthermore, a single container may be provided covering an entire leading edge even if this leading edge comprises nose rib(s).

The at least one nose rib may comprise a through hole configured to install the container through the through hole. In some embodiments, the container may extend on each side of such through hole of the nose rib.

In a particular embodiment, at least one container filled with a non-Newtonian fluid is arranged so as to contact at least part of the concave side of the leading plate.

Hereinafter, embodiments regarding how the leading edge according to the first aspect is secured to the torsion box of the airfoil (i.e., a portion of the lifting surface) will be described.

In an embodiment, the container filled with non-Newtonian fluid may take advantage of the presence of the torsion box structure, by being attached directly to its ribs. In another embodiment, the container may be attached to an additional support structure or an auxiliary spar.

Thus, in a particular embodiment, the leading edge further comprises this supporting structure adapted to be secured to the torsion box of the airfoil, this supporting structure being configured to support at least one container.

Advantageously, the shape of the different configurations for a supporting structure may be designed so as to confine the container into a particular volume within the cavity that permits free-deformation of the container, while increasing the surface of the support structure in contact with the container.

In either scenario, the shape of the supporting structure is designed so as to maximize the contact surface with the container for transferring part of the load to the supporting structure. The supporting structure may also be designed so as to maximize the contact surface between the container and the leading plate for transferring load from the leading plate to the non-Newtonian fluid.

In a particular embodiment, this supporting structure comprises a resting cradle for at least one container. The resting cradle may be fixedly connected to the torsion box of the airfoil (i.e., a portion of the lifting surface).

In a more particular embodiment, the resting cradle is fixed to the torsion box of the airfoil by fastening means. Preferably, these fastening means are rods configured to connect either to the torsion box front spar or a torsion box rib.

In a preferred embodiment, the supporting structure comprises a foam material mass which fills at least partially the remainder cavity not occupied by the container. Advantageously, the foam material is lighter and less resource demanding than composite or metallic materials used as part of alternative configurations for a supporting structure.

The foam mass supports the container filled with non-Newtonian fluid while permitting free-deformation of the container and contributing to absorb part of the energy received by the airfoil upon the event of suffering from an impact with an external flying body.

Some examples of foam materials may comprise polyurethane foam or high resilient foam.

In a particular embodiment, at least one container is fixed at least partially either to the concave side of the leading plate or the torsion box of the airfoil by adhesive means.

In a more particular embodiment the container is fixed at least partially to both the concave side of the leading plate and the torsion box of the airfoil.

In another embodiment, the leading edge is physically separate from the torsion box of the airfoil. The person skilled in the art should recognize that the leading plate, although separated from, transitions in geometry and shape to the upper and lower skins of the lifting surface. Advantageously, the container is part of a detachable leading edge.

In an alternative embodiment, the leading edge is integral with at least a portion of the upper and/or lower skins of the lifting surface. In other words, the leading plate extends beyond the front spar of the torsion box onto the torsion box itself. At a certain distance, this over-extension of the leading plate should overlap and attach to these upper and/or lower skins of the lifting surface.

In a particular embodiment, at least a portion of the contour of the cross-sectional shape of at least one container is configured for matching with a portion of the concave side of the leading plate.

Advantageously part of the external surface of the container is shaped so as to match with the concave side of the leading plate, the container abutting the inner surface of the leading plate, thus providing structural continuity through the contact interface.

This permits to better retain the container within the internal volume of the leading edge. Further, undesired fluid movements within the container (due to inertial movements of the aircraft) can thus be minimized.

In a preferred embodiment, the container is made from natural or synthetic rubber, such as nitrile rubber and chloroprene rubber, or thermoplastic polyurethane.

Preferably, the container is tear-resistant so as to avoid leakage and continued containment properties after birdstrike. Advantageously, this container is re-usable.

As mentioned, the container shall perform the function of containing the non-Newtonian fluid. In this sense, the resilient properties of a container made of the cited materials cooperate with the action of the non-Newtonian fluid by adjusting the boundaries of the container so as to adjust and absorb potential deformations of the non-Newtonian fluid contained therein, wherein the deformations are caused by inertia resulting from the movement of the aircraft because of, for instance, acceleration/deceleration during flight phases transitions, strong turbulence levels, or rotation about an aircraft axis (roll, pitch, yaw).

Further, the container will accommodate the non-Newtonian fluid shape changes due to the variable thermal conditions, as well as to the expansion/contraction resulting from a reaction of the non-Newtonian fluid upon an external disturbance (e.g., a bird strike), which may cause the non-Newtonian fluid to react by modifying its viscosity.

Further, a container made of the materials according to this particular embodiment protects the non-Newtonian fluid against humidity and corrosion, and is provided with improved tear resistance which ensures a wide range of tolerance under different operating conditions.

In a particular embodiment, examples of non-Newtonian fluid to fill at least one container comprise a polymer solution, a dispersion or a colloidal suspension. The non-Newtonian fluid may be a gel.

These fluids keep their properties, namely density, at altitudes of aircraft cruise speed.

In a second inventive aspect, the invention also provides an airfoil comprising a leading edge according to any of the embodiments of the first inventive aspect. As mentioned, this airfoil should be understood as a portion of the lifting surface, being, in a particular embodiment, the entire lifting surface.

In a preferred embodiment, this airfoil is an HTP, VTP or a wing.

Regarding the production of a leading edge according to the invention, the suppression of solid reinforcing elements such as additional composite material (additional carbon fiber/glass fiber layers in the layup configuration) or metallic plates/sheet mounted for absorbing the impact energy, results in easier manufacturing and handling processes.

The following inventive aspects provides alternative methods for assembling the described leading edges on an airfoil (i.e., at least a portion of the leading edge).

Therefore, in a third inventive aspect, the invention also provides a method for assembling a leading edge according to any of the embodiments of the first inventive aspect on an airfoil, wherein the method comprises the steps of:
  providing a leading plate with the at least one container;
  filling the at least one container with the non-Newtonian fluid; and
  securing the leading plate to the torsion box of the airfoil.

In a particular embodiment, the step of securing the leading plate to the torsion box of the airfoil is performed after filling the container with the non-Newtonian fluid is performed.

That is, the at least one container is filled with the non-Newtonian fluid while the leading edge is still disassembled, and, once the container is filled, the leading edge is assembled and secured as needed.

In an alternative embodiment, the step of filling the container with the non-Newtonian fluid is performed after securing the leading plate to the torsion box of the airfoil. In other words, the leading edge is provided and secured with the at least one empty container.

That is, the at least one container is filled with the non-Newtonian fluid after the leading edge has already been assembled. This reduces weight of the entire leading edge during early manufacturing steps and therefore eases its handling.

In a further embodiment, the method comprises the steps of:
  securing the leading plate to the torsion box of the airfoil; and
  arranging the at least one container between the concave side of the leading plate and the torsion box of the airfoil, the at least one container being filled with the non-Newtonian fluid after or before being arranged therein.

Advantageously, if the at least one container is filled after being arranged, this eases assembling tasks since there is no need of handling the container filled which implies extra labor due to weight, dimensions and slight rigidity of the container filled.

In a fourth inventive aspect, the invention also provides a method for assembling an airfoil according to any of the embodiments of the first, second or third inventive aspects of the invention, wherein the method comprises the steps of:
  providing a leading plate with the at least one container;

filling the at least one container with the non-Newtonian fluid; and securing the leading plate to the torsion box of the airfoil.

BRIEF DESCRIPTION OF THE DRAWINGS

These and other characteristics and advantages of the invention will become clearly understood in view of the detailed description of the invention which becomes apparent from preferred embodiments of the invention, given just as an example and not being limited thereto, with reference to the drawings.

DETAILED DESCRIPTION OF THE PREFERRED EMBODIMENTS

Once an object of the invention has been outlined, specific non-limitative embodiments are described hereinafter. The skilled person should recognize that aspects described herein may be embodied as a leading edge, an airfoil or even a method for assembling the leading edge.

Figure 1:
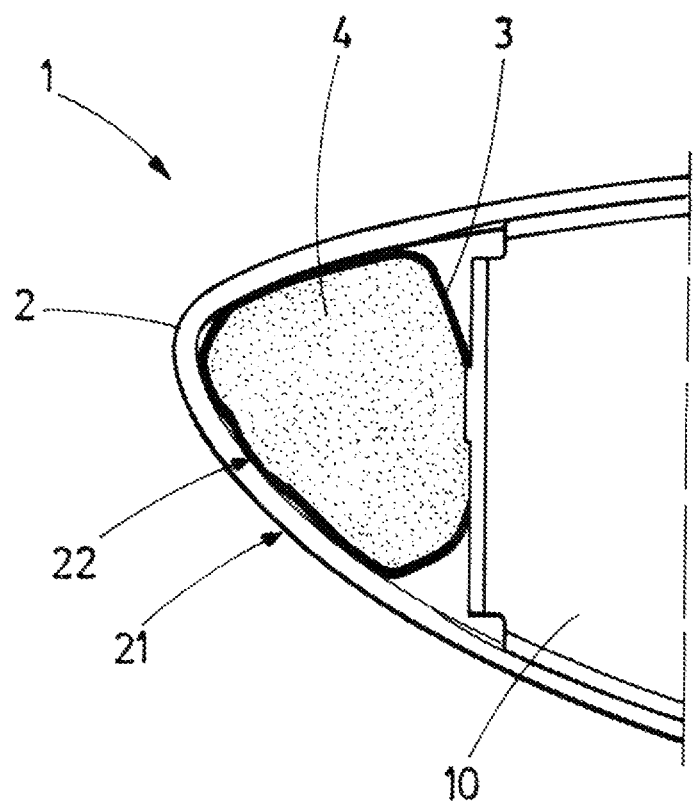
FIG. 1 shows a schematic partial representation of an airfoil comprising an embodiment of a leading edge according to the invention.

FIG. 1 shows a schematic representation of an airfoil comprising an embodiment of a leading edge (1) according to the invention. In this sense, as defined previously, an airfoil is understood as a length portion spanwise of a lifting surface. Hence, the airfoil shown is construed as a portion of the lifting surface. Some examples of lifting surfaces may be the wing, the horizontal tail plane or the vertical tail plane.

In particular, the figure depicts a leading edge (1) for an airfoil of an aircraft, the leading edge (1) comprising a leading plate (2) with a convex side (21) seen from the outside of the aircraft. This means that the convex side (21) of the leading plate (2) is the part of the leading edge (1) exposed to the surrounding air field.

Accordingly, by virtue of the definition provided for an "airfoil of an aircraft", the convex side (21) is also the part of the whole lifting surface to which the leading edge (1) belongs exposed to the surrounding air field. Hence, the convex side (21) of the leading plate (2) is exposed to potential impacts against incoming flying objects, such as bird strikes.

The leading plate (2) of the leading edge (1) further comprises a concave side (22), facing inwards. Therefore, the concave side (22) is seen from the curvature center of the surface, and is also the part of the leading plate (2) seen from the inside of the leading edge (1).

The leading edge (1) is configured to be secured to the torsion box (10) of the airfoil, for example, by means of a nose rib coinciding in location with a corresponding rib of the torsion box (10), so that the leading plate (2) is secured thereto.

The aforementioned structural parts of the airfoil (the leading plate (2) and the torsion box (10)) are arranged so as to define an internal volume between the concave side (22) of the leading plate (2) and the foremost portion of the torsion box (10), the internal volume or cavity being configured for allowing a container (3) filled with a non-Newtonian fluid (4) to be confined within. In particular, the container (3) shown in the representation of FIG. 1 is in the form of an elastic bag (3).

Such an elastic bag (3) reinforces the behavior of the leading plate (2), and thus of the whole lifting surface, against potential impacts against external flying objects. The size of the internal volume or cavity is depicted greater than the volume occupied by the elastic bag (3), since the design of the internal volume must take into account the fact that the non-Newtonian fluid (4) contained within the elastic bag (3) is allowed to freely deform, due to the fact that its intrinsic properties involve abrupt changes of fluid (4) parameters like shape and viscosity.

For the purpose of containing such a reactive fluid (4), the elastic bag (3) is provided with fluid-tight, resilient and tear-resistant properties that allow adjusting the boundaries of the elastic bag (3) so absorb potential deformations of the non-Newtonian fluid (4) contained within, while preventing leakage and providing continued containment after bird strike. Some examples of materials used for the manufacturing of the elastic bag (3) may comprise natural or synthetic rubber, such as nitrile rubber and chloroprene rubber, or thermoplastic polyurethane.

In the embodiment depicted, the elastic bag (3) is adhered to part of the concave side (22) of the leading plate (2), and to part of the foremost portion of the torsion box (10), such that, upon collision of an external flying object against the convex side (21) of the leading plate (2), part of the load transferred to the structure will be directly transferred to the elastic bag (3) and to the non-Newtonian fluid (4) thereby. By this way, the particles of the non-Newtonian fluid (4) will readily react upon the introduction of load modifying its viscosity, so as to behave as a solid body for the absorption and dispersion of the kinetic energy transferred between the colliding flying body and the leading plate (2) as a result of the impact.

Figure 2C:
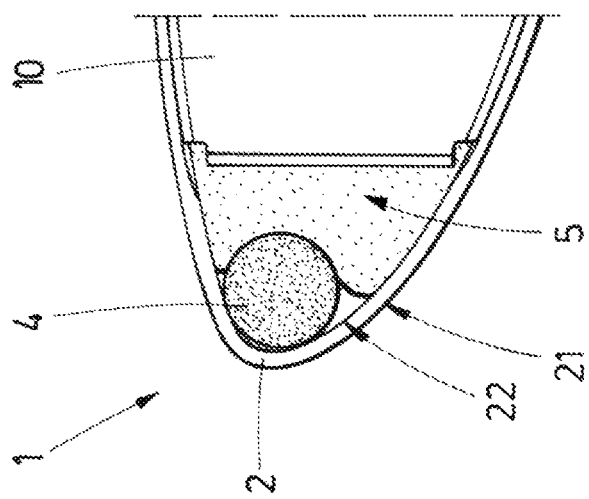
FIGS. 2a,b,c show schematic representations of airfoils comprising a leading edge according to the invention, each representation showing a different fixing mechanism for the container with the leading edge.
Figure 2B:
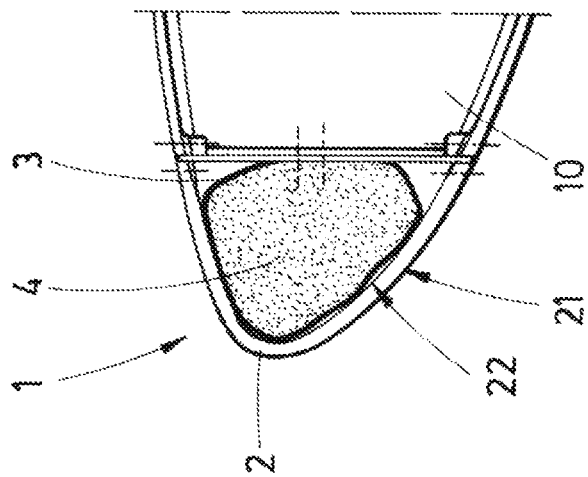
Figure 2A:
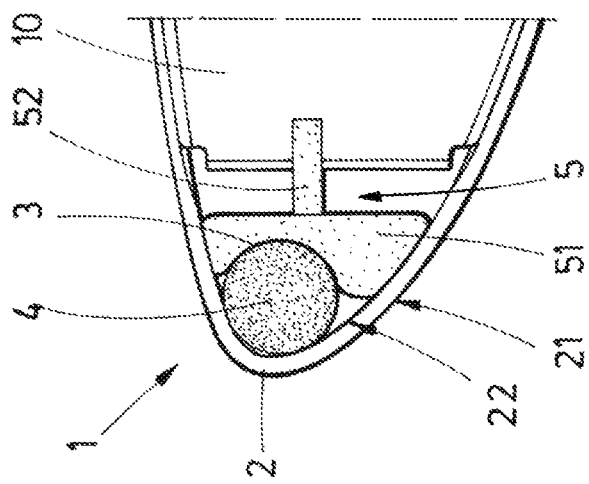

FIGS. 2a, 2b and 2c show schematic representations of three airfoils comprising a leading edge (1) according to the invention, each representation showing a different coupling/fixing mechanism for the container (3) within the cavity of the leading edge (1).

In particular, in FIG. 2a, there is further depicted a supporting structure (5) of the leading edge (1) adapted to be secured to the torsion box (10) of the airfoil. This supporting structure (5) is configured to fix at least one container (3), which in this figure is provided in the form of an elastic bag (3), by a resting cradle (51) and rod(s) (52).

On one side, the elastic bag (3) is adhered, or otherwise simply abutting, to part of the concave side (22) of the leading plate (2). On the other side, the elastic bag (3) is supported on the resting cradle (51) provided within the internal volume between the concave side (22) of the leading plates (2) and the foremost portion of the torsion boxes (10) for accommodating the elastic bag (3).

The resting cradle (51) is provided with a circular shape which maximizes the contact surface with the elastic bag (3), while contributing to confine and maintain the elastic bag (3) abutting the concave side (22) of the leading plate (2).

Further, for improving support and load transmission between the elastic bag (3) and the torsion box (10), the resting cradle (51) is mechanically fixed to the torsion box (10) by means of at least one rod (52).

In turn, the embodiment depicted in FIG. 2b corresponds to a modification of the embodiment shown in FIG. 1. However, here the leading edge (1) is provided as a modular assembly, wherein the leading plate (2) is shown in the form of a detachable nose, which may be removably coupled to the rest of the structure which is part of the lifting surface.

In particular, a portion of the leading plate (2) comprising the convex side (21) and the concave side (22) with the elastic bag (3) attached thereto may be detached from the rest of the leading plate (2) and the torsion box (10). The detaching interface is represented using parallel dashed lines in the portion of the leading plate (2) wherein the parts are decoupled, and with a straight thick line tangent to the foremost portion of the torsion box (10). These dashed lines further represent the necessary attaching means for allowing the modular capacity.

In a particular embodiment, the leading edge (1) may comprise a rear panel closing the internal volume or cavity. This rear panel is attached to upper and lower edges of the leading plate. This easies handling during assembling.

FIG. 2c corresponds to a modification of the embodiment shown in FIG. 1, wherein the supporting structure (5) is in the form of a polyurethane foam mass which is depicted filling the remainder internal volume or cavity formed within the lifting surface, more particularly, within the leading edge (1) of the invention and not occupied by the container (3). The cavity is defined between the concave side (22) (i.e., the inner surface) of the leading plate (2) and the torsion box (10).

The polyurethane foam mass (5) supports the container (3) filled with non-Newtonian fluid while permitting free-deformation of the container (3) and contributing to the absorption of part of the energy received by the airfoil upon the event of suffering from an impact with an external flying body.

Figure 3:
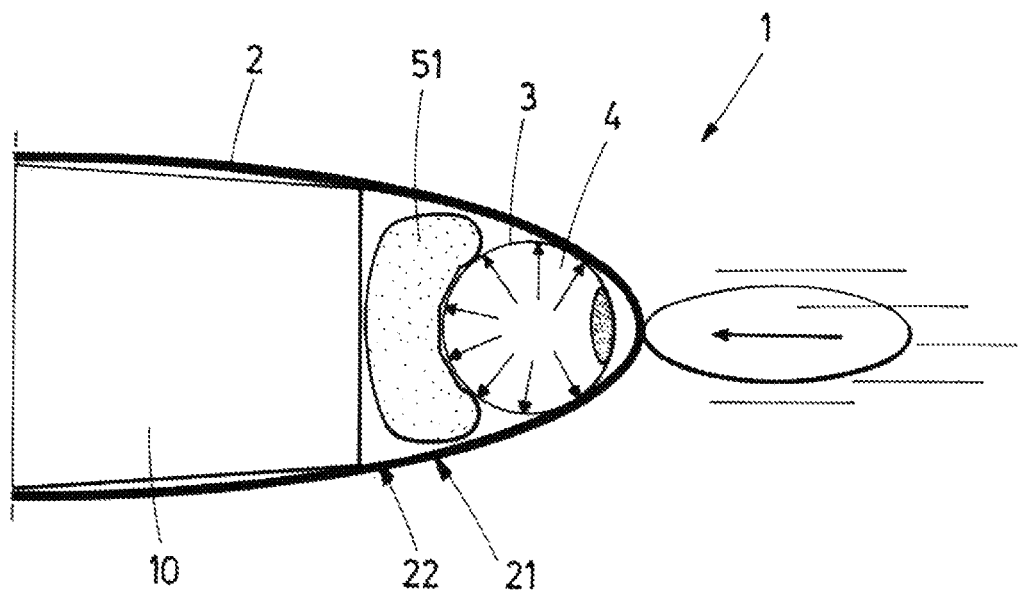
FIG. 3 shows a schematic representation of the reaction forces of a leading edge according to the invention upon an impact with an external flying body.

FIG. 3 shows a representation of an external flying body, depicted with an elliptic shape, colliding against the foremost portion of the convex side (21) of a leading plate (2) in a leading edge (1) according to the invention.

Further, the figure schematically shows the internal load distribution and dispersion mechanism of a container (3) filled with a non-Newtonian fluid (4) upon the introduction of load resulting of an impact with an external flying body. The mechanism is represented with a plurality of arrows distributed radially and pointing outwards of the circular-shaped container (3). The arrows illustrate that the load is internally distributed throughout the volume of the fluid (4) in the form of hydrostatic pressure, achieving a more homogeneous structural load distribution which allows for better structural optimization.

By this way, the foremost portion of non-Newtonian fluid (4) (closest to the concave side (22)) may suddenly react upon such impact by the instant increase of viscosity which shall gradually decrease throughout the rest of the fluid. The kinetic force of the impact will determine the amount of fluid (4) reacting in the instant of the impact. It is to be noted that certain non-Newtonian fluids (4) further exhibit a time-dependent viscosity, so after a certain time from the impact (no longer exerting pressure thereon) the whole non-Newtonian fluids (4) relaxes and returns to its original condition.

In the embodiment depicted, the elastic bag (3) is represented as being adhered to part of the concave side (22) of the leading plate (2), and resting on a cradle structure (51) such as the one shown in the embodiment of FIG. 2a, the resting cradle (51) resting likewise on the foremost portion of the torsion box (10), for further transmission of part of the loads thereby.

Notwithstanding the above, other supporting structures (5), such as the foam mass shown in FIG. 2b, can be used instead of the cradle structure (51) with bars (52).

The impact of the external flying object against the convex side (21) of the leading plate (2), results in the transmission to the elastic bag (3), and the non-Newtonian fluid (4) contained within, of part of the load introduced to the structure. As mentioned, the particles of the non-Newtonian fluid (4) will react upon the introduction of the load by modifying its viscosity, so as to behave as a solid body for the absorption and dispersion of the kinetic energy, depending on the energy level of the impact. Therefore, the elastic bag (3) filled with non-Newtonian fluid (4) will provide the leading edge (1) with an adaptive load reaction to the collision with the colliding body.

Figure 4:
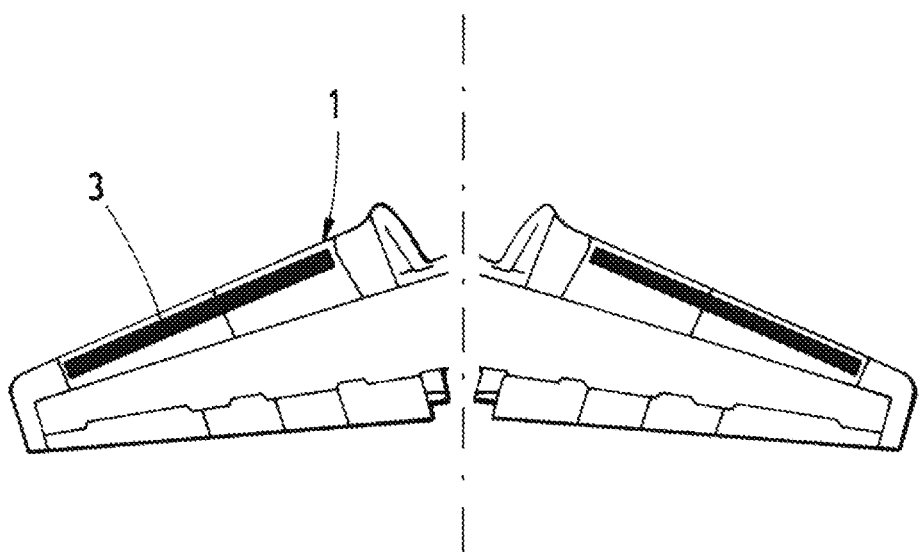
FIG. 4 shows a top plan view of a lifting surface of an aircraft comprising an embodiment of a leading edge according to the invention, wherein a single container covers the entire leading edge length spanwise.

FIG. 4 shows a top plan view of a lifting surface of an aircraft comprising an embodiment of a leading edge (1) according to the invention.

In particular, the lifting surface depicted corresponds to the horizontal tail plane (HTP) of an aircraft, wherein a single container (3) extends along at least the 80% leading edge (1) length spanwise.

It is to be noted that this represented lifting surface has a 'swept angle' backward (i.e., the leading edge is not perpendicular to the incoming airstream), and therefore, flying items may impact the leading edge (1) in a non-perpendicular direction.

Figure 5:
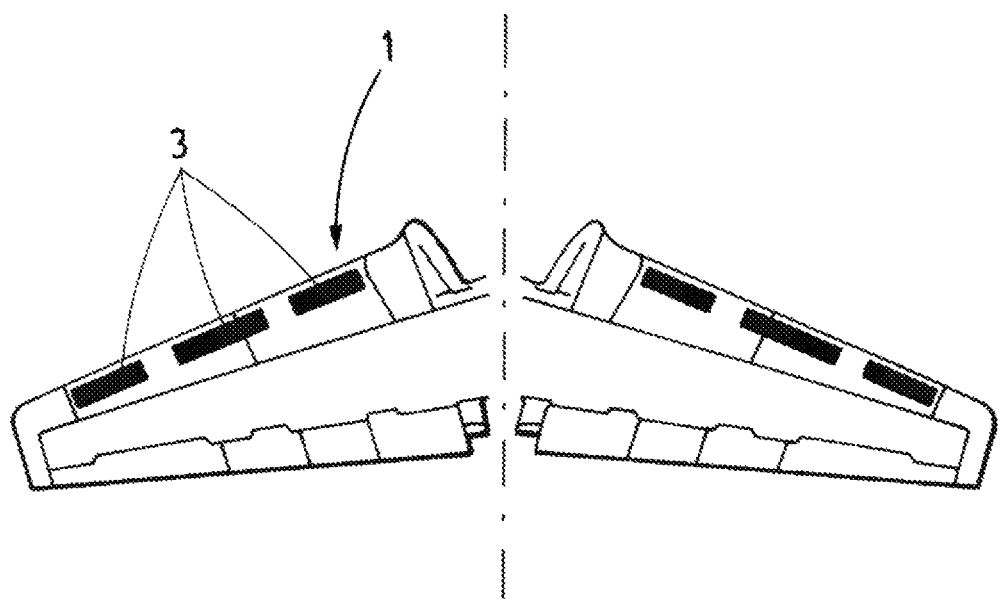
FIG. 5 shows a top plan view of a lifting surface of an aircraft comprising an embodiment of a leading edge according to the invention, wherein a plurality of containers cover different portions of the leading edge length spanwise.

In turn, FIG. 5 shows a top plan view of a lifting surface of an aircraft comprising another embodiment of the leading edge (1) according to the invention, wherein a plurality of containers (3) cover different portions of the leading edge (1) length spanwise.

Preferably, each of these containers (3) can be confined between two different nose ribs of the leading edge (1). The containers (3) closest to either the root or the tip of the lifting surface may be adapted in shape so as to accommodate the cross-sectional increase/decrease of the internal volume as approached to that ends.

Alternatively, in FIG. 5, a plurality of contiguous shorten leading edges (1), each comprising a single container filled with non-Newtonian fluid (4), can be envisaged. Therefore, a modular configuration can be applied herein.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A leading edge for an airfoil of an aircraft, the leading edge comprising:
   a leading plate with a convex side and a concave side,
   at least one container filled with a non-Newtonian fluid, wherein the leading edge is configured to be secured to a torsion box of the airfoil thus forming a cavity between the concave side of the leading plate and the torsion box of the airfoil, the at least one container being arranged, at least partially, within said cavity, wherein at least a portion of a wall of the at least one container is made of a resilient material, and wherein the at least one container is fixed at least partially to the torsion box of the airfoil.

2. The leading edge according to claim 1, wherein the at least one container filled with the non-Newtonian fluid is arranged so as to contact at least part of the concave side of the leading plate.

3. The leading edge according to claim 1, wherein the leading edge further comprises at least one nose rib arranged so as to be secured to the torsion box of the airfoil.

4. The leading edge according to claim 3, wherein the at least one container extends along a length portion of the leading edge spanwise up to a location of the nose rib.

5. The leading edge according to claim 1, wherein the at least one container consists of a single container which extends along substantially an entire leading edge length spanwise.

6. The leading edge according to claim 5, wherein the single container extends along at least 80% of a length portion of the leading edge spanwise excluding a root fairing and a tip fairing of the leading edge.

7. The leading edge according to claim 1, further comprising a supporting structure configured to be secured to the torsion box of the airfoil, the supporting structure being configured to support the at least one container.

8. The leading edge according to claim 7, wherein the supporting structure comprises a foam material mass.

9. The leading edge according to claim 7, wherein the supporting structure comprises a resting cradle for supporting the at least one container, the resting cradle being fixedly connected to the torsion box of the airfoil.

10. The leading edge according to claim 9, wherein the resting cradle is fixedly connected to one of a torsion box front spar or a torsion box rib.

11. The leading edge according to claim 1, wherein the at least one container is fixed at least partially to the concave side of the leading plate by adhesive means.

12. The leading edge according to claim 1, wherein at least a portion of a contour of the cross-sectional shape of at least one container is configured for matching with a portion of the concave side of the leading plate.

13. The leading edge according to claim 1, wherein the leading edge is configured to permit free-deformation of the at least one container at least partially within the cavity upon a change of a shape of the non-Newtonian fluid contained therein.

14. The leading edge according to claim 1, wherein the non-Newtonian fluid to fill the at least one container is a polymer solution, or a colloidal suspension.

15. An airfoil comprising a leading edge according to claim 1.

16. A method for assembling a leading edge according to claim 1 on an airfoil comprising a torsion box, wherein the method comprises the steps of:

providing a leading plate with the at least one container;

filling the at least one container with a non-Newtonian fluid; and securing the leading plate to a torsion box of the airfoil.

17. The method according to claim 16, wherein the step of filling the at least one container occurs after the step of securing the leading plate.

18. The method according to claim 16, wherein the step of filling the at least one container occurs prior to the step of securing the leading plate.

* * * * *